United States Patent

[11] 3,628,251

[72] Inventor Erich J. Feldl
1422 McCain Lane, Manhattan, Kans. 66502
[21] Appl. No. 72,580
[22] Filed Sept. 16, 1970
[45] Patented Dec. 21, 1971

[54] ROTATING PENCIL-COMPASS
9 Claims, 3 Drawing Figs.
[52] U.S. Cl. .................................................. 33/27 B
[51] Int. Cl. .................................................. B43l 9/02
[50] Field of Search ........................................ 33/27 R, 27 B, 27 C

[56] References Cited
UNITED STATES PATENTS
2,701,417  2/1955  Graham ........................ 33/32 R
3,237,308  1/1966  Dorstewitz ................... 33/27 B Primary Examiner—Harry N. Haroian
Attorney—Schmidt, Johnson, Hovey, Williams & Chase ABSTRACT: One leg of a compass has a pencil which is rotatable about its longitudinal axis relative to the remainder of the compass. A yoke at the top of the compass is rotatable relative to the finger knob of the compass is operably coupled with the pencil and is adapted to be manually held against rotation while the compass is turned by the knob. Relative rotation between the pencil and the remainder of the compass is thereby effected during such turning and the pencil tip remains sharpened.

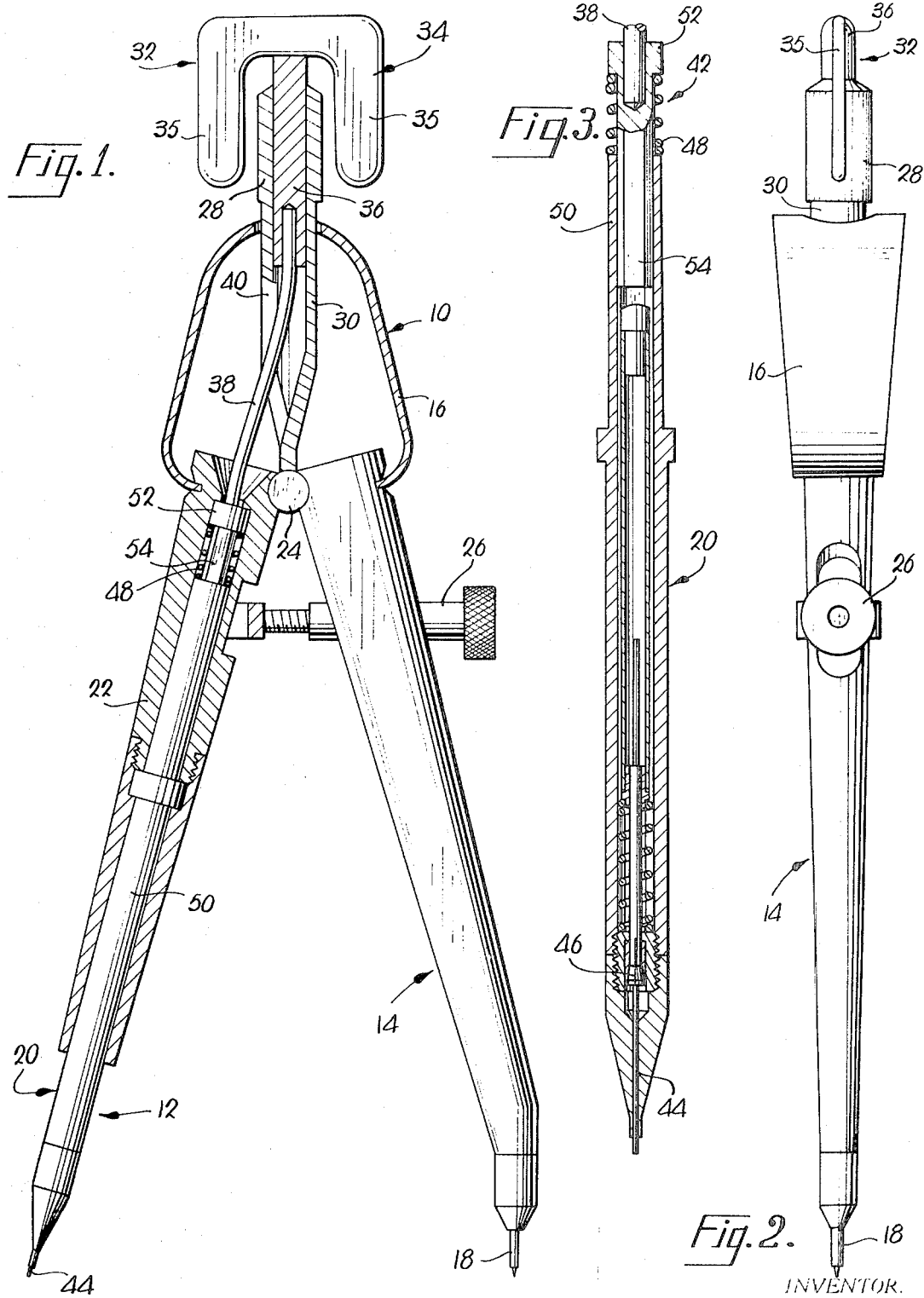

ROTATING PENCIL-COMPASS

This invention relates generally to drawing instruments and, more specifically, to compasses.

The present invention is directed toward solving a problem which has for many years confronted draftsmen or the like who use compasses, the problem being especially prevalent when compasses having thin pencil leads were used. This problem concerns the need for maintaining a properly sharpened tip of the pencil lead in order to produce accurate, clear lines on the drawing surface during use of the compass.

In the past it has been necessary to initially prepare the pencil tip by filing or sanding the tip into either a wedge or conical configuration and to periodically repeat this process as the tip became worn through continued use. Such repeated resharpening of the pencil tip not only was bothersome and time-consuming, but also presented problems in keeping the drawings free of graphite particles produced during sharpening of the tip.

It is, therefore, an important object of the present invention to provide an inexpensive, mechanically simple, and convenient means of effecting relative rotation between the marker of a compass and the remainder of the compass as the latter is rotated during use, whereby to maintain the tip of the marker in a constantly sharpened condition.

Another important object of this invention is the provision of a compass incorporating the above described features wherein the presence of such features in no way adversely affects the adjustability of the legs of the compass.

A further important object of the instant invention is to provide a compass as above described wherein operation of a pushbutton system for extending a pencil lead from the marker is not hampered by the presence of components for effecting the relative rotation of the marker and the remainder of the compass.

In the drawing:

FIG. 1 is an elevational view of a compass constructed in accordance with the principles of my present invention, certain components of the compass being shown in cross section to reveal details of construction;

FIG. 2 is an elevational view of the compass in FIG. 1 rotated 90°; and

FIG. 3 is an enlarged, fragmentary, cross-sectional view taken along the longitudinal axis of the pencil of the compass illustrating mechanism for supplying lead to the pencil point.

The compass illustrated in the drawing is of a type that utilizes graphite leads as a marking medium, but it is to be understood that the principles of my invention may be applied equally as well to compasses using other means for producing lines or marks on appropriate surfaces. Such means may include, for example, ink, chalk, or the hardened tip of a metal scribe.

Referring initially to FIGS. 1 and 2, the compass illustrated therein basically comprises a rotatable main support 10 and a pair of elongated legs 12 and 14 connected to support 10 for rotation therewith. The support 10 includes an arcuate, generally circular mount 16 which serves to attach leg 14 to support 10 at the lower end of mount 16. The lowermost end of leg 14 is pointed to present a needle 18 or other similar device for contacting the surface upon which a circle is to be described and defining an axis about which support 10 may rotate.

Leg 12 comprises a pencil 20 mounted for rotation about its longitudinal axis by a cylinder 22 secured at its upper end to the lower end of mount 16. One upper corner of cylinder 22 and an adjacent upper corner of leg 14 are pivotally interconnected by means of a hinge 24 to permit legs 12 and 14 to move toward and away from one another for drawing circles of various diameters. An adjusting screw 26 below hinge 24 interconnects legs 12 and 14 for incremental movement of legs 12 and 14 toward and away from each other.

The compass is also provided with a manually engageable tubular knob element 28 having a shank 30 extending through the upper margin of mount 16 and secured at its lower end to hinge 24, the knob 28 having an irregular outer surface to facilitate gripping thereof during rotation of support 10 about the axis established by needle 18.

Relative rotation between the support 10 of the compass and pencil 20 is effected by means of structure 32 which includes a manually engageable yoke member 34 looped over knob 28, the yoke 34 having a pair of thin, downwardly extending blades 35 on opposite sides of knob 28, and a central shaft 36 slidably and rotatably received within knob 28. A flexible rod 38 secured to the lower end of shaft 36 extends through an elongated slot 40 in shank 30 of knob 28 and is connected at its lower end to the upper end of pencil 20.

As shown most clearly in FIG. 3, pencil 20 includes mechanism broadly denoted by the numeral 42 which is operable upon depression of the yoke shaft 36 within knob 28 to release an additional length of lead 44 from the grip of jaws 46. The yoke shaft 36 is normally held in an undepressed condition by means of a coil spring 48 disposed between the upper end of the casing 50 of pencil 20 and a shoulder 52 on an actuator plunger 54 within casing 50.

The compass is designed such that desirable results may be obtained with a minimum of effort and inconvenience. Once the lead 44 has been extended from pencil 20 to a sufficient extent and legs 12 and 14 spaced apart for a desired distance, needle 18 should be placed in contact with the drawing surface to establish the axis of rotation for the compass.

As a suggested manner of operation, the compass may be rotated by gripping knob 28 between the index finger and thumb of the user's hand and then imparting a spin to knob 28 by moving the thumb and index finger in opposite directions. The location and configuration of yoke 34 causes at least one of the blades 35 thereof to loosely project between the user's thumb and index finger during such spinning of knob 28, whereby the yoke 34 is maintained in a stationary condition as knob 28 continues to spin.

Manifestly, spinning of the knob 28 produces a corresponding rotation of support 10 and leg 14 about the axis established by needle 18 as leg 12 revolves about such axis. However, because of the essentially rigid connections between yoke shaft 36, rod 38 and pencil 20, relative rotation between pencil 20 and the remainder of the compass is effected while knob 28 is spun and yoke 34 is held stationary.

Normally, leg 12 of the compass will approach the drawing surface at less than a 90° angle therewith, whereby imparting relative rotation between lead 44 and the remainder of the compass causes the tip of lead 44 to be continually worn into a conical configuration inasmuch as all sides of lead 44 are presented for wear. In contrast, the lead of compasses heretofore available always presented the same regions or sides of the lead for wear and hence tended to become blunt through continued use instead of sharpened to a point.

Having thus described the invention, what is claimed as new and desired to be secured by Letters Patent is:

1. In a compass:
    a rotatable support;
    a pair of elongated legs pointed at one end thereof;
    means attaching one of said legs to the support;
    means mounting the other of said legs on the support for rotation of said other leg about its longitudinal axis,
    the pointed end of said one leg being adapted to contact a surface upon which a circle is to be described by the pointed end of the other leg,
    said pointed end of the one leg defining an axis about which said one leg rotates and about which said other leg revolves during rotation of the support; and
    structure coupled with said other leg for effecting relative rotation of the support and said other leg during said rotation of the support.

2. The invention of claim 1, wherein said structure includes a manually engageable member for holding said other leg against rotation with said support as the latter is rotated.

3. The invention of claim 2, wherein is provided a manually engageable element on the support adjacent said member for rotating the support.

4. The invention of claim 3, wherein said element comprises a finger knob and said member comprises a finger yoke looped over the knob.

5. The invention of claim 4, wherein said knob is tubular and said yoke has a shaft rotatable in the knob and operably coupled with said other leg.

6. The invention of claim 5, wherein said mounting means includes a tube attached to the support and having said other leg rotatable therein.

7. The invention of claim 6, wherein is provided a rod interconnecting the shaft and said other leg.

8. The invention of claim 7, wherein said other leg comprises a retractable lead pencil operable upon reciprocation of the rod, said shaft being reciprocable within the knob permitting reciprocation of the rod upon manual actuation of the yoke.

9. The invention of claim 8, wherein said legs are swingable toward and away from each other and wherein said rod is flexible, permitting said swinging of the legs.

* * * * *